May 21, 1963
C. T. WALTERS
3,090,350
OILER FOR DOUGH PORTIONS
Filed May 27, 1960
3 Sheets-Sheet 1
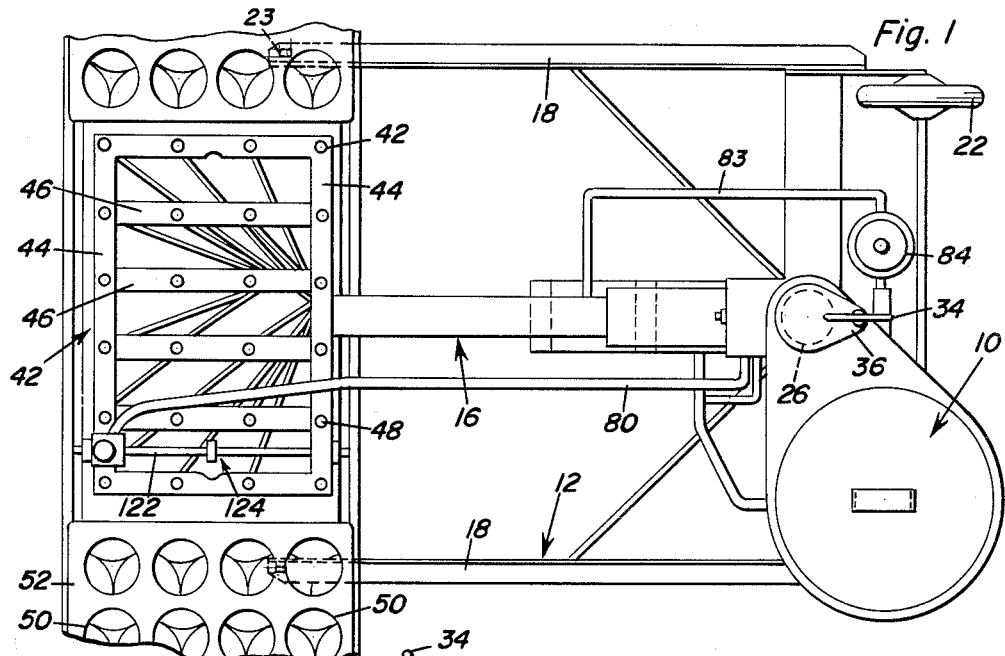
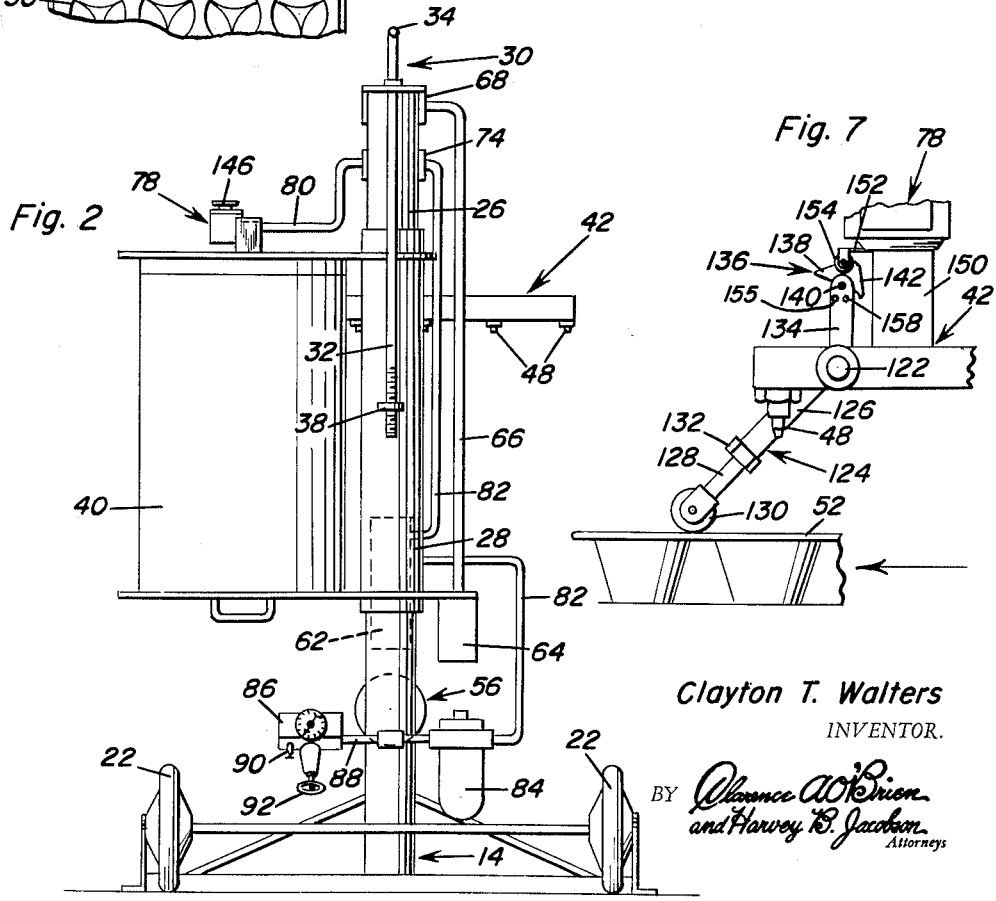
Clayton T. Walters
INVENTOR.
BY Clarence A. O'Brien
and Harvey B. Jacobson
Attorneys May 21, 1963

C. T. WALTERS 3,090,350

OILER FOR DOUGH PORTIONS

Filed May 27, 1960

Clayton T. Walters
INVENTOR.

BY *Clarence A. O'Brien*
*and Harvey B. Jacobson*
Attorneys

May 21, 1963
C. T. WALTERS
3,090,350
OILER FOR DOUGH PORTIONS
Filed May 27, 1960
3 Sheets-Sheet 3
Fig. 4
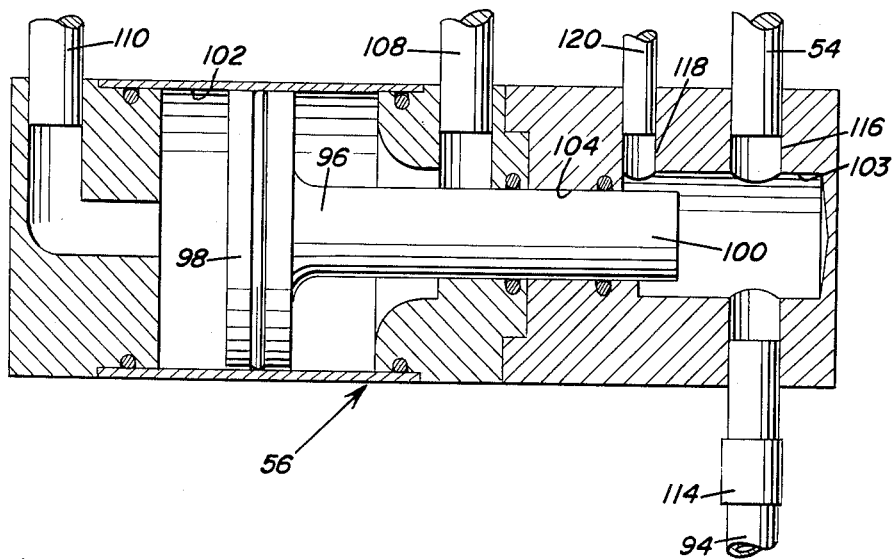
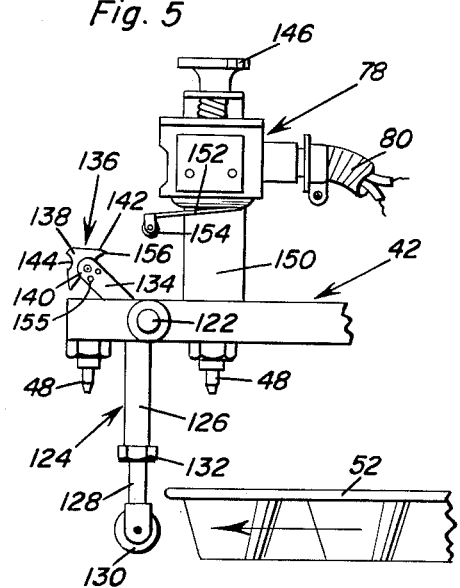
Fig. 5
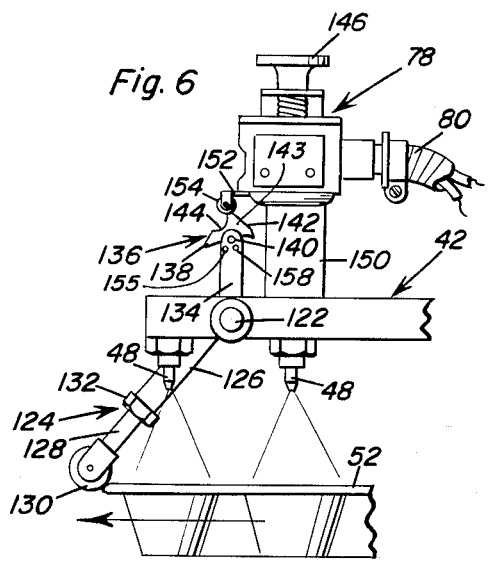
Fig. 6
Clayton T. Walters
INVENTOR.
BY *Clarence A O'Brien*
*and Harvey B. Jacobson*
Attorneys

United States Patent Office 3,090,350
Patented May 21, 1963

3,090,350
OILER FOR DOUGH PORTIONS
Clayton T. Walters, Corpus Christi, Tex., assignor to Clayton Specialties, Inc., Corpus Christi, Tex., a corporation
Filed May 27, 1960, Ser. No. 32,337
5 Claims. (Cl. 118—2)

This invention relates to a novel and useful device for applying oil to bakery products, and more particularly to a device for applying oil to the individual dough portions of "Parkerhouse" rolls.

In the process of making rolls in a commercial bakery, a plurality of pieces of dough are placed in each section of a multi-section pan. When these plurality of pieces of dough in each section of a multi-section pan are properly oiled, the individual sections will not bake into a single section roll during the baking process but will form into a multi-section roll such as a "Parkerhouse" roll.

Several different methods are used to prevent the separate dough portions of a single compartment or section of a multi-section pan from rising into a single mass including manually applying oil to the dough in each section of a multi-section pan. When the manual method is used, a person is designated at a given spot and supplied with either a squirt can of oil or a can of oil and a brush so that each individual section of a multi-section pan may have the dough positioned therein properly oiled. Of course, the manual process of oiling the dough requires considerable time and inasmuch as the process is completed by manual labor, the operation is not as sanitary as it could be.

Another technique for oiling dough has been to provide a plurality of spigots that drip oil over a given location with a catch basin therebeneath to receive the oil that does not actually fall on the dough in the pans. In this case, the pans are handled by a conveyor that passes beneath the given location of the spigots dripping the oil. Perhaps the conveyor would be adjusted to hesitate momentarily properly positioning a pan beneath the drip spigots in order that the proper amount of oil could be applied to the dough in the pan. This form of applying oil to the dough is also not very sanitary inasmuch as in most instances, the oil falling into the catch basin is piped back to the spigots to be used rather than wasted.

The main object of this invention is to provide a machine for applying a proper predetermined quantity of oil onto the pieces of dough in each section of a multi-section pan with no excess dripping, waste or reclamation of excess oil.

A further object of this invention, in accordance with the immediately preceding object, is to provide a machine which will apply the oil to the dough in the multi-section pans as the latter move into and out of registry with the machine by means of a conveyor moving at a constant speed so that the application of oil to the dough is done promptly and at a rate completely compatible with the other machines or any single other machine in the bakery equipment line used to manufacture the rolls.

Yet another object of this invention, in accordance with the preceding objects, is to provide a machine having a part thereof engageable by the multi-section pans carried by a conveyor for actuating the machine and dispensing the oil whereby it will be assured that the multi-section pans are properly positioned at the instant the lubricating machine is operated.

A still further object of this invention is to provide a machine capable of intermittently dispensing a predetermined quantity of oil so that each pan of rolls passing in registry therewith will be treated in the same manner.

A further object of this invention, in accordance with the immediately preceding object, is to provide a means whereby the predetermined amount of oil to be dispensed at each operation of the machine may be adjusted as desired.

And a final object to be specifically enumerated herein is to provide a machine which will conform to conventional forms of manufacture, be of simple construction and be simple in operation so as to provide a device that will be economically feasible, long lasting and dependable in operation.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a top plan view of the bakery machine and a fragmentary portion of a conveyor mechanism registering therewith having multi-sectioned pans of portions of dough;

FIGURE 2 is a rear elevational view of the bakery machine illustrated in FIGURE 1 as seen from the right side thereof;

Figure 3:
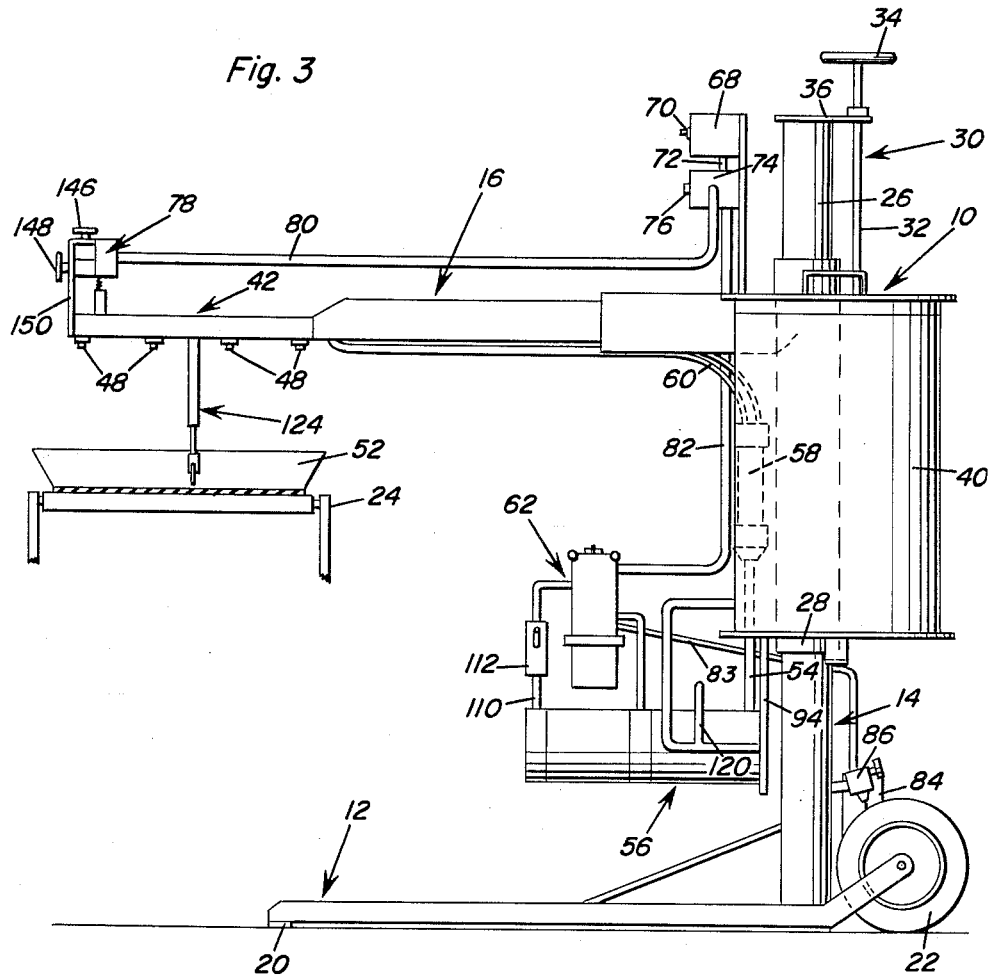
FIGURE 3 is a side elevational view of the bakery machine as seen from the left side of FIGURE 2, portions of the conveyor mechanism being shown with a multi-section pan thereon for engagement with the actuating mechanism of the oiling machine.

FIGURE 4 is a transverse longitudinal vertical sectional view of the air and hydraulic cylinder comprising the power source for injecting a given quantity of oil at each operation of the machine; and FIGURES 5 through 8 are fragmentary elevational views of the control switch operating mechanism of the oiling machine and showing the manner in which the feeler arm of the control switch operating mechanism engages the pans passing beneath the spray head portion of the oiling machine to actuate the latter at the proper instant when the pans are properly positioned relative to the spraying mechanism.

Referring now more specifically to the drawings the numeral 10 generally designates the oiling machine comprising the present invention. The oiling machine 10 includes a mounting or support base generally designated by the reference numeral 12, a supporting standard generally designated by the reference numeral 14 and a laterally projecting support boom generally designated by the reference numeral 16 carried by the upper end of the support standard 14.

A supporting base 12 is substantially U-shaped in plan and includes a pair of supporting legs 18. The front ends of the legs 18 are provided with supporting feet 20, see FIGURE 3, and the rear ends thereof are provided with supporting wheel assemblies 22. If it is desired, the supporting feet 20 may be adjusted to increase or decrease the height of the forward ends of the legs 18 by means of fasteners 23 by which the supporting feet 20 are secured to the legs 18. Thus, it will be noted that the machine 10 may be conveniently moved to any position along the conveyor mechanism such as that illustrated in FIGURES 1 and 3 of the drawings and indicated generally by the reference numeral 24.

The support standard 14 includes a vertically disposed cylindrical standard 26 on which there is slidably disposed for vertical movement therealong a supporting sleeve 28. An adjusting mechanism generally referred to by the reference numeral 30 is provided for vertically adjusting the sleeve 28 and includes a screw shaft 32 whose upper end is provided with a handle 34 and is journalled in a support 36. The lower threaded end of the screw shaft 32 is threadedly engaged in an apertured lug 38 secured to the sleeve 28 in any convenient manner. In this manner, it will be noted that the vertical height of the sleeve 28 may be adjusted upon manipulation of the handle 34. The support boom 16 carried by the sleeve 28 may therefore also be vertically adjusted relative to the conveyor mechanism 24.

The support boom 16 includes a sprayer head frame generally designated by the reference numeral 42, see FIGURE 1, which includes a pair of longitudinal members 44 and a plurality of transverse members 46. A plurality of spray nozzles 48 are carried by the longitudinal and transverse members 44 and 46 of the spray head frame 42. It is to be understood that the spray nozzles 48 are positioned on the frame 42 to correspond in positioning of the plurality of compartments 50 in the bakery pan 52 positioned on the conveyor assembly 24.

Each of the sprayer nozzles 48 is communicated with the oil exhaust line 54 of the hydraulic and pneumatic cylinder assembly generally designated by the reference numeral 56 by means of an oil manifold 58 having a plurality of oil lines 60 secured and connected to each of the spray nozzles 48.

The hydraulic and pneumatic cylinder assembly 56 is provided with a conventional solenoid operated air valve generally designated by the reference numeral 62, see FIGURE 3, which may be supported in any convenient manner.

Referring now more specifically to FIGURES 2 and 3 of the drawings it will be noted that the oiling machine 10 is provided with an electrical inlet box 64 to which an available source of electricity may be connected. An electrical conduit 66 extends between the inlet box and the on-off box 68 having an on-off switch 70. A conduit 72 connects the on-off box 68 with a control switch box 74 having a control switch 76. The control switch box 74 is connected to the micro-switch assembly generally referred to by the reference numeral 78 by means of an electrical conduit 80.

The solenoid operated air valve 62 is connected to the control switch box 74 by means of an electrical conduit 82 and is actuated by means of the micro-switch assembly as will be hereinafter more fully set forth.

The solenoid operated air valve 62 is provided with a source of compressed air by means of a tube 83 extending from the air line lubricator 84 which is in turn supplied with air from the air pressure regulating valve 86 by means of line 88. If it is desired, the air pressure regulating valve 86 may be provided with a drain cock to drain condensation from the air regulator valve. The air regulator valve 86 is provided with an adjustment handle 92 and it is to be understood that it is connected to a suitable source of compressed air (not shown).

The supply tank 40 has a conduit 94 extending therefrom and connected to the inlet of the cylinder 56.

The hydraulic and pneumatic cylinder assembly 56, see FIGURE 4 in particular includes a double-ended piston 96 having a head 98 o none end and a head 100 on the other end. The piston head 98 is slidably disposed in a large cylindrical portion 102 of the hydraulic and pneumatic cylinder assembly 56 and the piston 100 is slidably disposed in bore 104 and projects into the chamber or cylinder 103.

The piston head 98 is laterally enlarged thereby defining a pair of chambers in the cylindrical portion 102. An inlet line 108 provides one chamber with compressed air and an inlet line 110 provides the other chamber of compressed air from the solenoid operated air valve 62. A swing check valve 112 is disposed in the inlet line 110.

Upon operation of the micro-switch assembly 78, the solenoid operated air valve 62 will alternately provide air pressure to the chambers on opposite sides of the head 98 to effect reciprocating movement of the piston 96. The conduit 94 comprises the inlet oil line for the cylinder 103 and has a check valve or choke 144 disposed therein. It will be noted that the oil contained in the supply tank 40 is conveyed to the interior of the cylinder 103 by means of gravity. Of course, if it is desired, the supply tank 40 could be disposed below the cylinder assembly 56 and the oil could be delivered to the cylinder assembly 56 by means of air pressure in the supply tank 40.

The cylinder 103 is provided with an exhaust port 116 in which one end of the oil exhaust line 54 is secured for supplying oil to the oil manifold 58 and subsequently to the spray nozzles 48. The cylinder 103 is also provided with a by-pass port 118 having one end of a by-pass line 120 secured therein with the other end of the by-pass line being connected to the supply tank 40.

Thus, upon reciprocating movement of the piston head 98 the head 100 will move back and forth in the cylinder 103. Upon movement of the head 100 to the left as viewed in FIGURE 4, oil from the supply tank 40 will enter the cylinder 103 by means of the conduit 94. Then, upon subsequent movement of the piston 100 in the opposite direction, upon actuation of the micro-switch assembly 78, the desired amount of oil will be forced through the oil exhaust line 54 and subsequently to the spray nozzles 48. The hydraulic by-pass line 120 serves to lessen the amount of fluid exhausted through the coil exhaust port 116 if it is desired.

The spray head frame 42 journals a transversely extending rocker shaft 122, see FIGURE 1, which supports the upper end of a feeler arm generally designated by the reference numeral 124. The feeler arm 124 includes a sleeve 126 secured to the rocker shaft 122, see FIGURES 5 through 8 in which there is threadedly engaged the upper end of a rod 128 having a roller 130 journalled on the lower end thereof. The rod 128 may be adjusted and positioned relative to the feeler arm 124 and locked in that position by means of jam nut 132. A lever arm 134 is fixed to one end of the rocker shaft 122 in any convenient manner and has secured to the upper end thereof a lost motion cam assembly generally designated by the reference numeral 136. The cam assembly 136 includes a cam member 138 pivotally secured for movement about an axis parallel to the axis of rotation of the rocker shaft 122 by means of pivot shaft 140. The cam element includes an approach surface 142, a toe portion 143 and an abrupt departure surface 144 comprising a semi-circular recess opening away from the pivot shaft 140.

The micro-switch assembly 78 includes an adjustable knob 146 and a mounting knob 148 by which the micro-switch assembly 78 is mounted to the support 150 carried by the spray head frame 42. The position of the micro-switch assembly 78 relative to the spray head frame 42 may be adjusted by loosening knob 148 and adjusting knob 146.

The micro-switch assembly 78 includes a switch arm 152 having a roller 154 journalled on the free end thereof for engagement with the approach and departure surfaces 142 and 144 of the cam element 138.

In operation, as the pan 52 carried by the conveyor 24 moves beneath the spray head frame 42 toward a position properly aligned for the pieces of dough positioned in the individual compartments 50 of the pan 52 to be sprayed by the spray nozzles 48, the roller 130 on the lower end of the rod 128 of the feeler arm 122 will engage the forward end of the pan 52 to rotate the rocker shaft 122 from a position similar to that illustrated in FIGURE 5 engaging stop pin 155 to a position similar to that illustrated in FIGURE 6 with the roller 154 of the switch arm 152 positioned on the toe portion 143 disposed uppermost on the approach surface 142 of the cam member 138 when the toe portion 143 is disposed in the operative limit position defined by stop in 155. Final movement of the roller 132 to the upper surfaces of the pan 52 will rotate the lever arm 134 to a position moving the cam element 138 whereby the roller 154 on the switch arm 152 will be engaged in the recess forming the departure surface 144 as illustrated in FIGURE 7 of the drawings. However, as the roller 154 reaches its uppermost point of travel, the micro-switch will be closed and the solenoid operated air valve 62 will be actuated to effect movement of the piston 96 toward the right as seen in FIGURE 4 to dispense the desired quantity of oil from the cylinder 103 and out of the spray nozzles 48 beneath which the compartments 50 of the pan 52 are positioned. As the roller 154 is seated in the recess 144 as illustrated in FIGURE 7 of the drawings, a micro-switch circuit is opened thus effecting actuation of the air controlled valve 62 to effect movement of the piston 96 in a direction to the left as seen in FIGURE 4 of the drawings thereby introducing a subsequent charge of oil into the cylinder 103 by means of the conduit 94 and the check valve or choke 114 in readiness for the next application of oil to the dough in the next pan 52 carried by the conveyor 24. In addition, as the piston 96 moves to the left as viewed in FIGURE 4, a partial vacuum will be formed in the exhaust line 54 thereby causing a suction at the spray nozzles 48 and preventing the latter from dripping oil.

Figure 8:
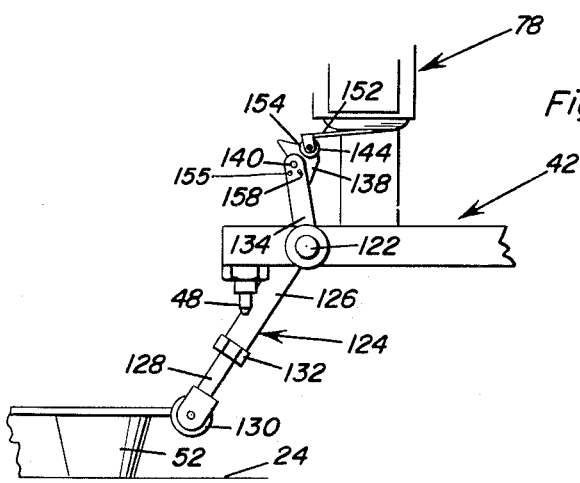

As the rear edge of the pan 52 passes beneath the roller 130 as illustrated in FIGURE 8 of the drawings, the roller 154 seated in the recess 144 will effect pivotal movement of the cam element 138 and of the toe portion 143 from the inoperative position illustrated in FIGURE 8 back to the operative limit position with the heel 156 of the cam element 138 engaging the stop pin 158. Then, as the arm 124 pivots by gravity to the position illustrated in FIGURE 5, the cam element 138 will be snapped into the position illustrated in FIGURE 5 in order to position the cam element 138 in readiness for the engagement of the feeler arm 124 with the next pan 52.

Thus, each and every pan 52 carried by the conveyor 24 will have the dough positioned in the compartments 50 thereof anointed with a proper amount of oil as the pan is positioned with its compartments 52 registered with the corresponding spray nozzles 48 and positioned immediately therebeneath.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. In an oiling machine for dough in a commercial bakery line, a frame, a supply of oil, a spray head attached to said frame, a pneumatic cylinder having a piston, a hydraulic cylinder having a piston, an oil conductor connecting said hydraulic cylinder with said oil supply, means connected with said pneumatic cylinder for operating the piston of said pneumatic cylinder and including an air valve, mechanical means coupling the pistons of said cylinders so that said pistons operate in unison, and means operatively connected with said air valve for intermittently actuating said air valve, and means connected with the chamber of said hydraulic cylinder and with said spray head for intermittently expressing oil under pressure from said hydraulic cylinder to said spray head, said spray head including a plurality of spray nozzles with which said oil conductive means are connected, said means for actuating said air valve including an electrical circuit having a switch and conductors extending from said switch to said air valve, and means including a feeler means moved by said pans for actuating said switch, said feeler means including a depending feeler arm pivotally secured at its upper end to said spray head for pivotal movement about a horizontal axis and adapted at its lower end for engagement by a pan passing beneath the spray head, a lever arm operatively connected to said feeler arm for swinging movement in response to swinging movement of the latter, lost motion cam means carried by the free end of said lever arm, a switch arm carried by said switch and having a depending actuator for engagement by said lost motion cam means, said lost motion cam means including a toe portion engaging said actuator upon movement of said feeler arm in one direction by its engagement with a pan passing beneath said spray head to close said electrical circuit and thereby actuate said air valve.

2. The combination of claim 1 wherein said cam means includes a cam element pivotally mounted for movement of said toe portion about an axis extending parallel to the axis of rotation of said feeler arm between operative and inoperative positions, said toe portion moving into the operational position upon movement of said feeler arm in said one direction and into the inoperative position upon movement of said feeler arm in the other direction, the departure surface of said cam element upon movement of said feeler arm in said one direction being abrupt and engaged by said actuator upon final movement of said feeler arm in said one direction.

3. The combination of claim 1 wherein said means connecting said supply with said hydraulic cylinder comprises a tube, a check valve in said tube, and the conductors connecting said hydraulic cylinder with said nozzle being exposed to suction upon movement of said hydraulic cylinder piston in one direction to prevent oil from dripping from said nozzles.

4. In an oiling machine for dough in a commercial bakery line, a frame, a supply of oil, a pumping chamber, a means communicating said pumping chamber with said supply of oil, a spray head including a plurality of spray nozzles supported from said frame, means communicating said pumping chamber with said spray nozzles, movable chamber volume varying means operable for alternately increasing and decreasing the effective volume of said chamber, motor means for actuating said chamber volume varying means including control means including an electrical circuit having a switch and conductor extending from said switch to said control means for actuating the latter, means including feeler means movable by contact with a dough pan for actuating said switch, said feeler means including a depending feeler arm pivotally secured at its upper end to said spray head for pivotal movement about a horizontal axis and adapted at its lower end for engagement by a pan passing beneath the spray head, a lever arm operatively connected to said feeler arm for swinging movement in response to swinging movement of the latter, lost motion cam means carried by the free end of said lever arm, a switch arm carried by said switch and having a depending actuator for engagement by said lost motion cam means, said lost motion cam means including a toe portion engaging said actuator upon movement of said feeler arm in one direction by its engagement with a pan passing beneath said spray head to close said electrical circuit and thereby actuate said control means.

5. The combination of claim 4 wherein said cam means includes a cam element pivotally mounted for movement of said toe portion about an axis extending parallel to the axis of rotation of said feeler arm between operative and inoperative position, said toe portion moving into the operational position upon movement of said feeler arm in said one direction and into the inoperative position upon movement of said feeler arm in the other direction, the departure surface of said cam element upon movement of said feeler arm in said one direction being abrupt and engaged by said actuator upon final movement of said feeler arm in said one direction.

References Cited in the file of this patent

UNITED STATES PATENTS 1,602,856    Robb _____ Oct. 12, 1926

(Other references on following page)

UNITED STATES PATENTS

| | | |
|---|---|---|
| 1,917,767 | Larson | July 11, 1933 |
| 2,103,817 | Johnson | Dec. 28, 1937 |
| 2,605,036 | Cozzoli | July 29, 1952 |
| 2,633,820 | Koerber | Apr. 7, 1953 |
| 2,830,846 | Teuch | Apr. 15, 1958 |
| 2,856,892 | Winfree et al. | Oct. 21, 1958 |
| 2,892,438 | Hery | June 30, 1959 |
| 2,912,169 | Peffer | Nov. 10, 1959 |
| 2,919,333 | Scholin et al. | Dec. 29, 1959 |